J. B. DAVIS.
DISH WASHER.
APPLICATION FILED DEC. 18, 1914.
1,158,452. Patented Nov. 2, 1915.
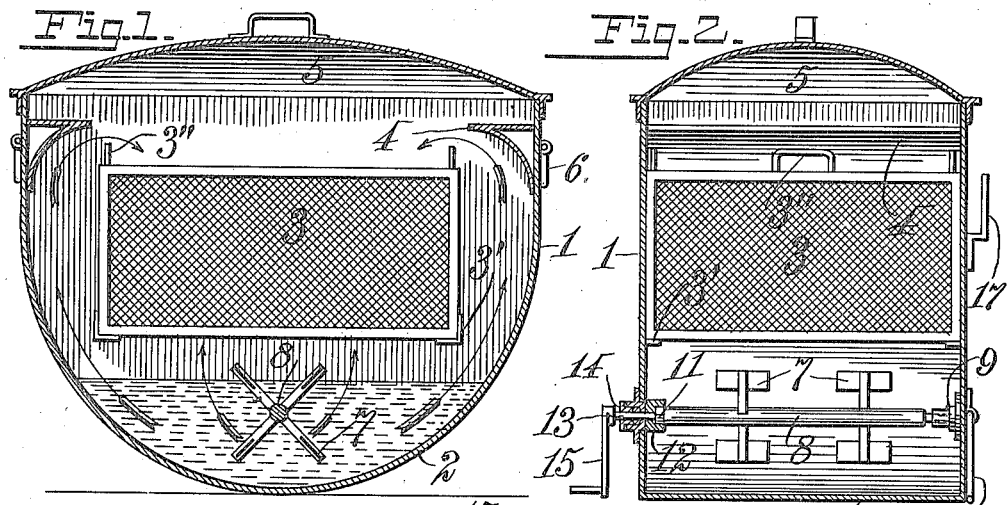
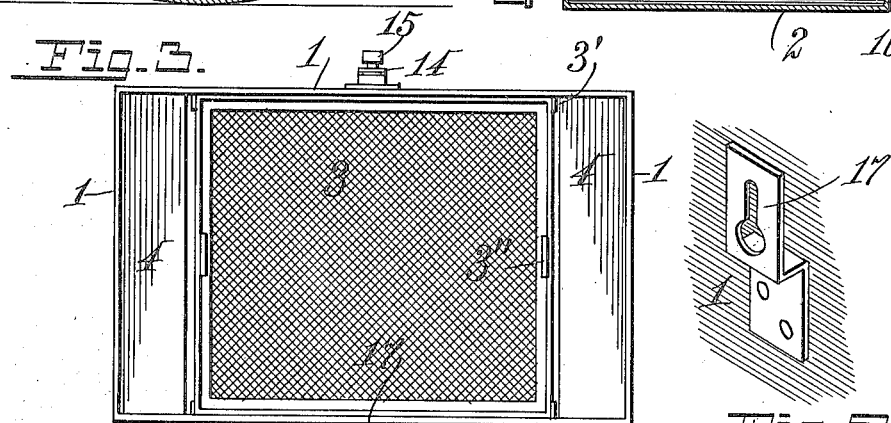
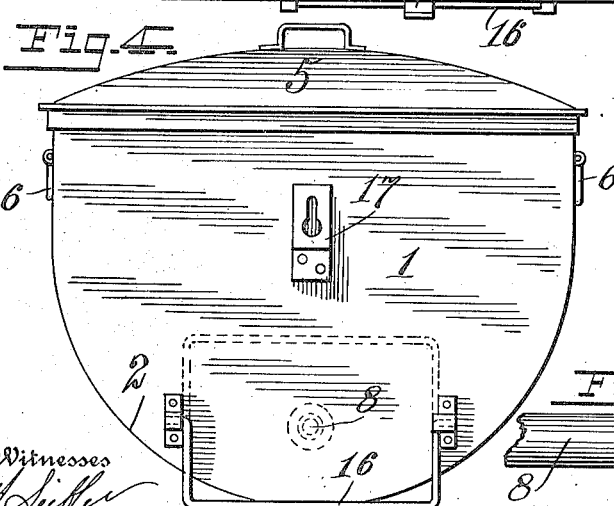
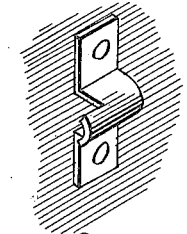
Witnesses
M. Leibler
M. Galloway
Inventor
J. B. Davis
By R. J. McCarty,
his Attorney

UNITED STATES PATENT OFFICE.

JOHN B. DAVIS, OF TOLEDO, OHIO.

DISH-WASHER.

1,158,452.      Specification of Letters Patent.      Patented Nov. 2, 1915.

Application filed December 18, 1914. Serial No. 877,863.

*To all whom it may concern:*

Be it known that I, JOHN B. DAVIS, a citizen of the United States, residing at Toledo, in the county of Lucas and State of Ohio, have invented certain new and useful Improvements in Dish-Washers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dish washers and has for its object to provide an inexpensive and efficient machine of this character which is especially adapted to domestic or household use, as will hereinafter more fully appear from the following description in connection with the accompanying drawings.

Referring to said drawings, Figure 1 is a longitudinal sectional elevation of my improved dish washer; Fig. 2 is a transverse sectional elevation thereof; Fig. 3 is a top plan view thereof with the cover removed; Fig. 4 is a side elevation of the machine; Fig. 5 is a detached view of one of the wall brackets upon which the machine is supported when operated in one way; Fig. 6 is a detached view of one of the ears by which the bail is secured in position; Fig. 7 is a detail view of the paddle shaft showing the bearing of one end thereof.

In a detail description of my invention, similar reference characters indicate the same parts both in said description and in the drawings annexed thereto.

The casing 1 is constructed of suitable sheet metal with a rounded bottom 2 upon which it may be rocked to throw the water onto and over the dishes contained in the wire basket 3. Preferably, I construct the casing of a length approximately twenty-four inches by a width say about eighteen inches, as I have found this size most suitable for household use. It will, of course, be understood that the dimensions of said casing may vary. Near the top of the casing and on the interior thereof curved deflectors 4 are placed cross-wise to turn the water onto the wire basket which contains the dishes, and the top of the casing is provided with a cover 5 and handles 6.

As hereinbefore stated, in operating the machine it may be rocked upon its rounded bottom, supported on a table, or any suitable stand, but I have means for agitating the water with the machine stationary. This means consists of a suitable number of paddles 7 arranged upon a shaft 8 in the bottom of the receptacle and below the wire basket. The rounded bottom of the receptacle, in addition to furnishing a surface upon which said receptacle may be rocked to throw the water over the dish holder, is instrumental in also assisting the action of the agitator 7 in guiding the water up along the sides of said receptacle. The shaft 8 has one of its journals supported in a bearing 9 on one side of the machine with a spring 10 engaging said end to hold the other journal 11 of said shaft in its socket. The said journal 11 is square or rectangular in cross-section and is received by a socket or bearing 12 which is fixed to the opposite inner side of the vessel. The extreme end 13 of the shaft extends through a stuffing box 14 and receives an operating crank 15, by which the paddles are operated. A few turns of the paddles in opposite directions causes the water to be thrown up into and over the dishes and hollow ware contained in the wire basket. In a word, the water is so thoroughly agitated and thrown into the dishes that both the inside and outside thereof become thoroughly cleansed in a comparatively short time. The arrows in Fig. 1 clearly indicate the flow of the water and its deflection when coming in contact with the turning walls 4. Substantially the same result is obtained by rocking the vessel upon its rounded bottom. In either way the dishes are thoroughly cleansed in the comparatively short time of a minute.

In using the paddles to throw the water into and over the dishes, the vessel may be supported on a table or stand by lowering the supporting bail 16 which has a straight portion that engages the table or stand and holds said vessel against any rocking motion; or the said vessel may be supported upon a wall in a convenient and stationary manner by means of the side brackets 17, a sufficient number of which may be attached to the sides thereof. The wire basket 3 for holding the dishes consists of a suitable wire mesh to allow the free passage of the water, and the said wire basket is snugly supported at each corner on an angular bracket 3' each of which is made secure to the side walls of the vessel. It is removable from the vessel by means of handles 3" one of which is attached to opposite sides.

It will be understood that the dishes only come in contact with the washing water while it is being agitated, and that after the washing operation, which requires but a minute or so, clean hot water may be poured over the dishes before removing the basket, to cleanse them, the heat therefrom serving to dry said dishes.

Having described my invention, I claim:

In a dish washing machine, the combination with a receptacle having a circular bottom, and overhanging water deflecting walls on the interior and adjacent to the mouth thereof, and a support adapted to maintain said vessel stationary on its rounded bottom, of a perforate dish receptacle mounted on corner brackets in said vessel, and an agitator mounted in said vessel below said dish receptacle, substantially as described.

In testimony whereof I affix my signature, in presence of two witnesses.

JOHN B. DAVIS.

Witnesses:
MELLIE GALLOWAY,
MATTHEW SIEBLE.